(12) United States Patent
Senda et al.

(10) Patent No.: US 7,249,940 B2
(45) Date of Patent: Jul. 31, 2007

(54) TEMPERATURE REGULATOR OF TEMPERATURE REGULATING PART UNDER HOPPER OF INJECTION MOLDING MACHINE

(75) Inventors: Koji Senda, Yamanashi (JP); Hideki Koyama, Fujiyoshida (JP)

(73) Assignee: FANUC Ltd, Yamanashi (JP)

( * ) Notice: Subject to any disclaimer, the term of this patent is extended or adjusted under 35 U.S.C. 154(b) by 390 days.

(21) Appl. No.: 10/859,361

(22) Filed: Jun. 3, 2004

(65) Prior Publication Data
US 2004/0258786 A1    Dec. 23, 2004

(30) Foreign Application Priority Data
Jun. 17, 2003 (JP) ............... 2003-172185
Mar. 30, 2004 (JP) ............... 2004-097709

(51) Int. Cl.
B29C 45/78 (2006.01)
(52) U.S. Cl. ............... 425/143; 425/144
(58) Field of Classification Search ............ 425/143, 425/144
See application file for complete search history.

(56) References Cited

U.S. PATENT DOCUMENTS

| 3,735,805 | A |   | 5/1973 | Stillhard |         |
| 4,902,454 | A | * | 2/1990 | Steinbichler et al. | 425/144 |
| 5,345,397 | A | * | 9/1994 | Handel et al. | 425/143 |

FOREIGN PATENT DOCUMENTS

| JP | 62-200418 | 12/1987 |
| JP | 62-203017 | 12/1987 |
| JP | 62-284715 | 12/1987 |
| JP | 63-082530 | 5/1988 |
| JP | 8-156062 | 6/1996 |
| JP | 08-164536 | 6/1996 |
| JP | 10-244333 | 9/1999 |
| JP | 2001-179416 | 7/2001 |
| JP | 2002-137271 | 5/2002 |
| JP | 2002-172667 | 6/2002 |

OTHER PUBLICATIONS

EP Search Report for corresponding EP Application No. 04253434.7 dated Jan. 7, 2005.
Notice of Grounds for Rejection (Office Action) for corresponding application JP 2004-097709 dated Sep. 13, 2005.
EP Search Report for corresponding EP Application No. 04 25 3434 dated Oct. 26, 2004.

* cited by examiner

Primary Examiner—Tim Heitbrink
(74) Attorney, Agent, or Firm—Staas & Halsey LLP

(57) ABSTRACT

A temperature regulator main body is connected to a cooling hole formed in a temperature regulating part under a hopper through a tube and comprises a tank for a cooling medium, a pump, a radiator, and a fan facing the radiator to send cold air and driven by a motor. By driving of the pump, the cooling medium circulates between the temperature regulating part under the hopper and the temperature regulator main body. A temperature sensor is provided to the temperature regulating part under the hopper. A controller for controlling an injection molding machine cools the circulating cooling medium by the fan and feedback controls the temperature of the temperature regulating part under the hopper when a temperature detected by the temperature sensor is higher than a preset temperature.

3 Claims, 5 Drawing Sheets

TEMPERATURE REGULATOR OF TEMPERATURE REGULATING PART UNDER HOPPER OF INJECTION MOLDING MACHINE

BACKGROUND OF THE INVENTION

1. Field of the Invention

The present invention relates to an injection molding machine and particularly to a temperature regulator of a temperature regulating part under a hopper.

2. Description of the Related Art

In an injection molding machine, resin as molding material is charged into a heating cylinder from a hopper, the resin as the molding material is heated and melted by rotation of a screw disposed in the heating cylinder and a heater disposed at an outer periphery of the heating cylinder, and the molten resin is injected into a mold. Because the resin as the molding material is charged into the heated heating cylinder, the resin as the molding material is partially melted in a charging portion from the hopper and the molten resin parts are coupled to each other to form bridges and, as a result, obstructs entrance of the resin into the heating cylinder. To solve this problem, a part under the hopper is conventionally treated as a temperature regulating part under the hopper (water jacket) a temperature of which should be regulated.

For example, there is art in which a radiator is disposed to face a fan of an air-cooling mechanism for an injection motor, a pump circulates cooling water between a temperature regulating part under a hopper and a radiator, the cooling water is heat-exchanged with cold air sent by the fan in the radiator, and the temperature regulating part under the hopper is cooled with the cooling water as disclosed in Japanese Patent Application Laid-open No. 62-284715.

There is also art in which a temperature sensor for detecting a temperature in a heating cylinder and a temperature sensor for detecting a temperature of abase block (a temperature regulating part under a hopper) are provided, a temperature controller sends a water temperature control signal and a water flow rate control signal to a drive unit of a water supplying device based on signals from the two temperature sensors, the drive unit drives a temperature regulator based on the water temperature control signal to adjust a temperature of water circulating among the base block (the temperature regulating part under the hopper), the temperature regulator, and a pump and to control a water flow rate of the pump based on the water flow rate control signal as disclosed in Japanese Patent Application Laid-open No. 2001-179416.

There is a temperature controller including a pump for circulating a cooling medium between a temperature regulating part under a hopper and a cooling medium tank, a heater for heating a cooling medium cooling part and the cooling medium in the tank, and a temperature control unit for detecting a temperature of the cooling medium to perform an ON/OFF control of the heater as disclosed in Japanese Patent Application Laid-open No. 2002-137271.

Moreover, there is a controller which includes a temperature regulator having a heat exchanger, a refrigerant heater, a refrigerant refrigerator, a temperature detector, a refrigerant circulating pump, an industrial water circulating pump, and the like and in which the refrigerant and the industrial water are heat-exchanged with each other by the heat exchanger to control the temperature of the refrigerant at a predetermined temperature to control the temperature of a cylinder flange (temperature regulating part under the hopper) as disclosed in Japanese Patent Application Laid-open No. 2002-172667.

Although the various devices have been developed as a temperature regulator of a temperature regulating part under the hopper as described above, they require a heater or a refrigerator. Moreover, they require the specific controller for controlling the temperature. For example, in the above art described in Japanese Patent Application Laid-open No. 62-284715, temperature control is not carried out. The above art described in Japanese Patent Application Laid-open No. 2001-179416 requires a cooling medium refrigerating portion and a heater and also requires the specific temperature control portion for controlling the temperature. Furthermore, the above art pieces described in Japanese Patent Application Laid-open No. 2002-137271 and Japanese Patent Application Laid-open No. 2002-172667 include the means for heating and cooling the refrigerant and the controller for controlling the means and are expensive.

SUMMARY OF THE INVENTION

The present invention relates to a temperature regulator of a temperature regulating part under a hopper of an injection molding machine, which comprises: a fan attached to a motor for cooling a cooling medium; a radiator facing the fan; a tank for storing the cooling medium; a pump for circulating the cooling medium; and a temperature sensor for detecting a temperature of the temperature regulating part under the hopper, wherein the pump circulates the cooling medium in the tank into the radiator and to the temperature regulating part under the hopper, the temperature detected by the temperature sensor is fed back, and control is carried out so that the temperature of the temperature regulating part under the hopper becomes equal to a set temperature.

According to a first aspect of the temperature regulator of the invention, the temperature regulator can control the temperature regulating part under the hopper by causing the controller of the injection molding machine to control operation of the fan such that the temperature of the temperature regulating part under the hopper, detected by the temperature sensor, becomes equal to a pre set temperature when the injection molding machine is in an ON state and a heater control of a heating cylinder of the injection molding machine is in an ON state.

According to a second aspect of the temperature regulator of the invention, a valve for switching circulating paths so that the cooling medium circulates through the temperature regulating part under the hopper or through a bypass circuit is provided, the controller feeds back the temperature detected by the temperature sensor when the injection molding machine is in an ON state and a heater control of a heating cylinder of the injection molding machine is in an ON state, and the controller of the injection molding machine controls the circulating paths of the cooling medium so that the temperature of the temperature regulating part under the hopper becomes equal to the set temperature.

In the first and second aspects of the temperature regulator of the invention, operation of the injection molding machine may be stopped with an alarm message displayed when an abnormal condition such as a reduction in the cooling medium occurs.

In the invention, the cooling medium circulates through the temperature regulating part under the hopper, the temperature of the temperature regulating part under the hopper is detected, and the temperature of the cooling medium is controlled so that the detected temperature becomes equal to the set temperature. Moreover, a control of the temperature of the cooling medium is carried out by the fan and the fan is controlled by the controller of the injection molding machine. Therefore, the temperature regulator of the temperature regulating part under the hopper can be formed at low cost.

Because the controller of the injection molding machine also controls the temperature regulator of the temperature regulating part under the hopper, the temperature regulator of the temperature regulating part under the hopper can be controlled when the injection molding machine is in the ON state and the heater control of the heating cylinder of the injection molding machine is in the ON state and safety can be maintained. Because the alarm is issued and the injection molding machine is stopped when the abnormal condition such as the reduction in the medium occurs, it is possible to safely bring the injection molding machine into operation.

With the above structure, the invention can provide the inexpensive temperature regulator of the temperature regulating part under the hopper.

BRIEF DESCRIPTION OF THE DRAWINGS

The above and other objects and features of the present invention will become apparent from the following description of the embodiments by reference to the accompanying drawings wherein.

DESCRIPTION OF THE EMBODIMENTS

Figure 2:
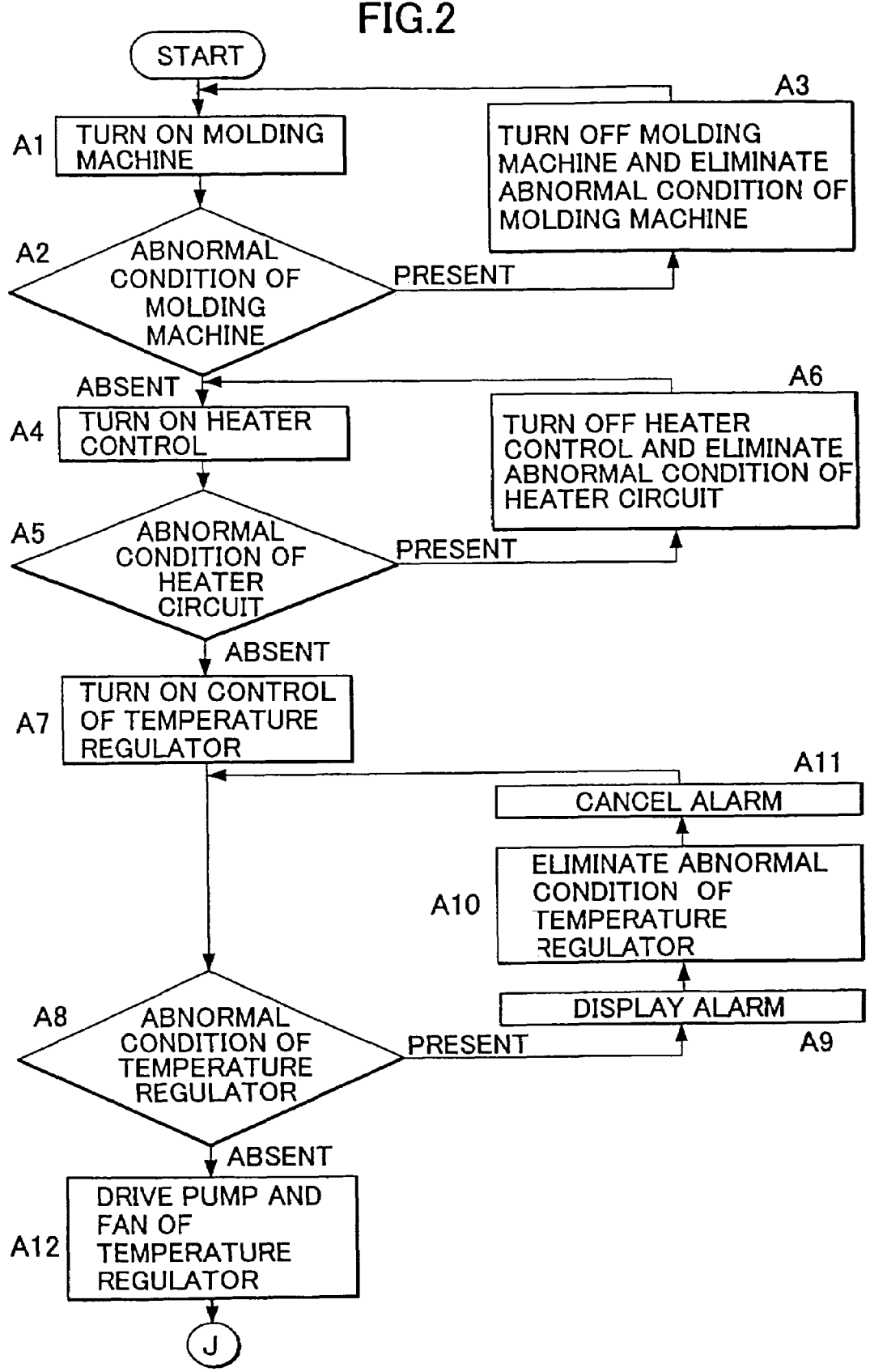
FIG. 2 is a flow chart of operation of the temperature regulator in FIG. 1.
Figure 3:
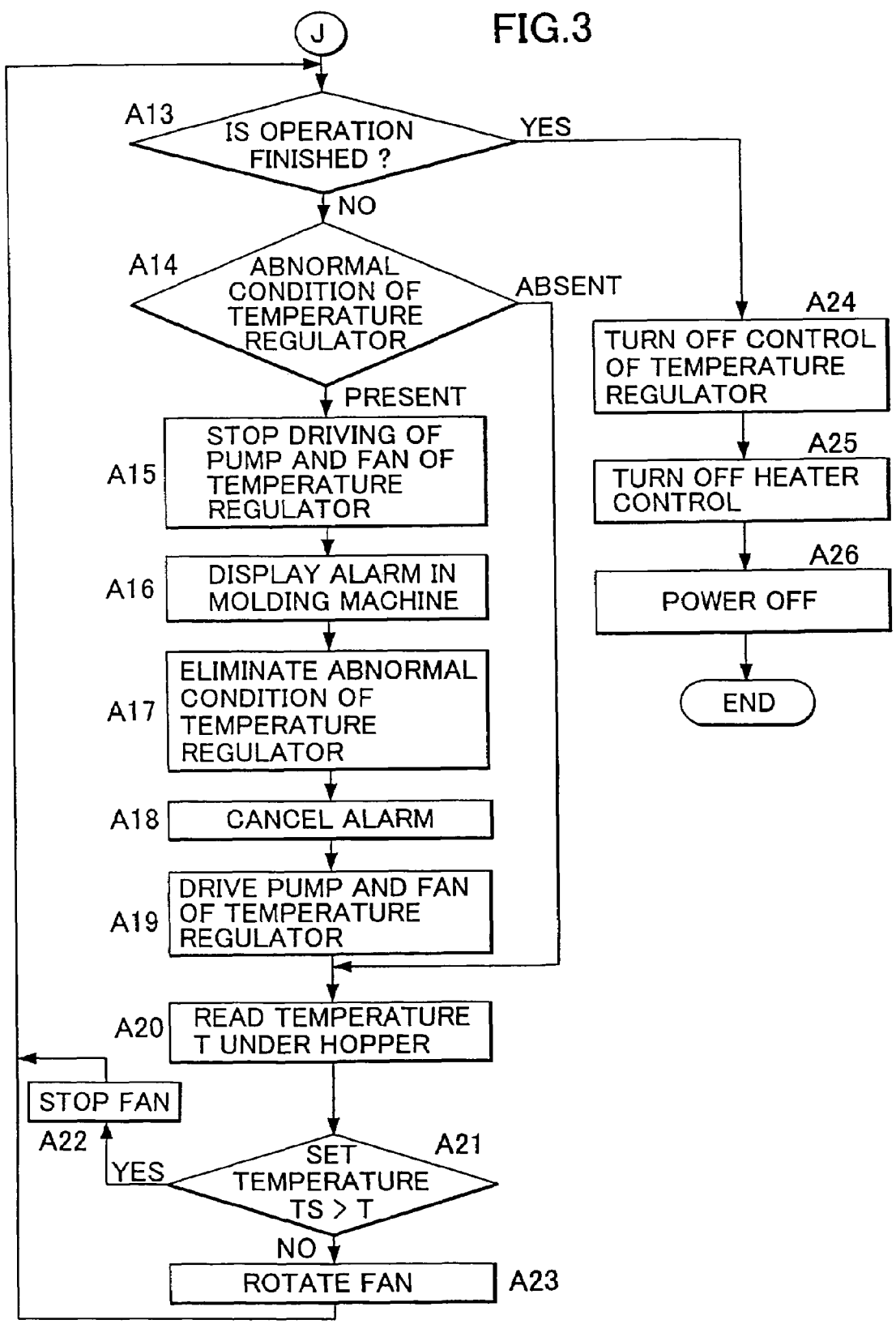
FIG. 3 is continued from the flow chart in FIG. 2.

First, a first embodiment of a temperature regulator under a hopper of an injection molding machine according to the present invention will be described by reference to FIGS. 1 to 3.

Figure 1:
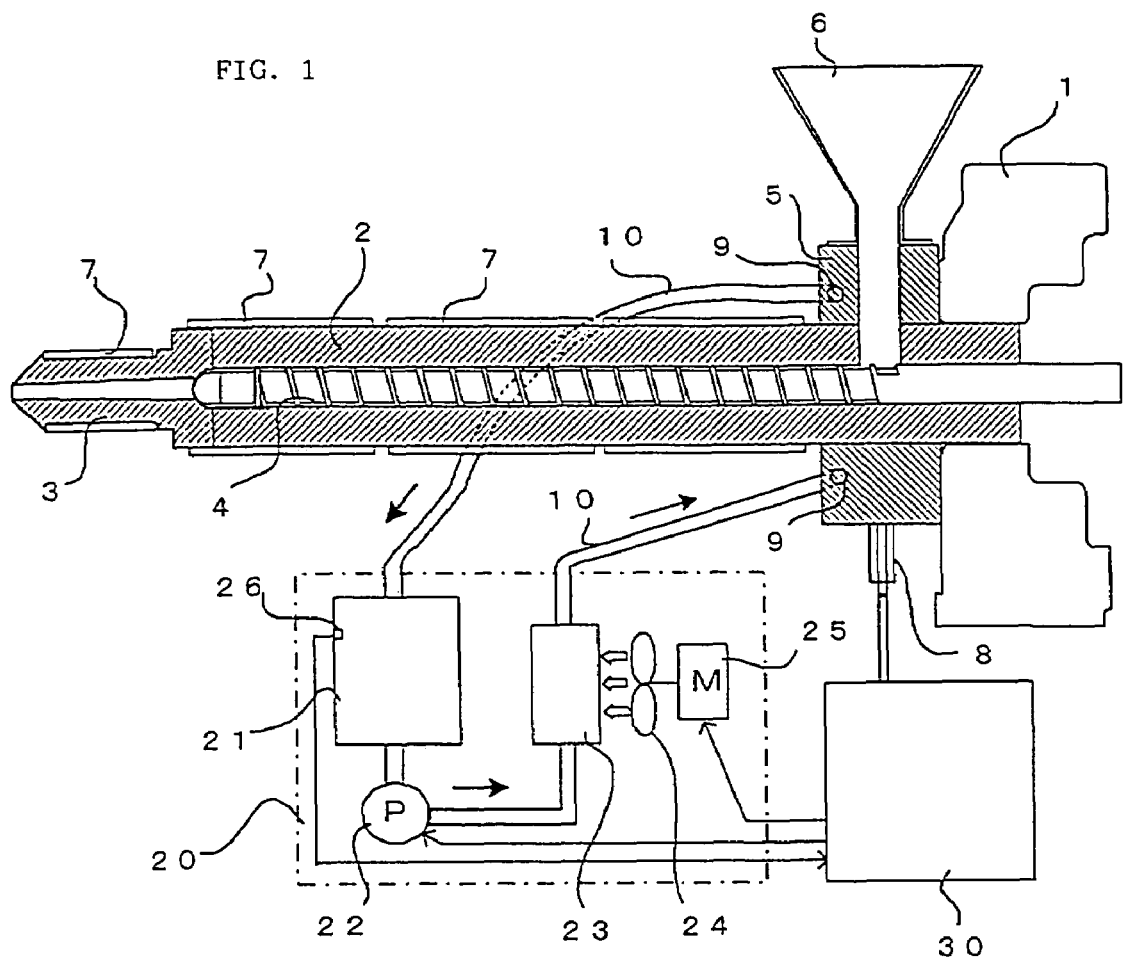
FIG. 1 is a schematic explanatory view of a first embodiment of a temperature regulator according to the invention.

As shown in FIG. 1, a heating cylinder 2 is mounted to a base portion 1 of an injection unit of the injection molding machine and a nozzle 3 is provided to a tip end of the heating cylinder 2. In the heating cylinder 2, an injection screw 4 is inserted. On a side of the base portion 1 mounted with the heating cylinder 2, a temperature regulating part 5 (water jacket) under the hopper, which comprises the hopper 6 for charging resin as molding material into the heating cylinder 2, is provided. A heater 7 is disposed at outer peripheries of the heating cylinder 2 and the nozzle 3. The molding material charged from the hopper 6 is melted by rotation of the injection screw 4 and heating by the heater 7, the molten molding material is moved in an axial direction of the injection screw 4 to thereby be injected into a mold (not shown), and molding is carried out.

The temperature regulating part 5 under the hopper is formed with a cooling hole 9 forming a cooling medium passage and is cooled by a cooling medium supplied through a tube 10 forming the cooling medium passage. The temperature regulating part 5 under the hopper is provided with a temperature sensor 8 for detecting a temperature of the temperature regulating part 5 under the hopper.

The tube 10 forming the cooling medium passage is connected to a temperature regulator main body 20. The temperature regulator main body 20 is formed of a tank 21 for the cooling medium, a pump 22, a radiator 23, and a fan 24 driven by a motor 25. The radiator 23 faces the fan 24. When the pump 22 is driven, the cooling medium in the tank 21 for the cooling medium passes through the radiator 23, is cooled by cold air from the fan 24, is lead into the cooling hole 9 of the temperature regulating part 5under the hopper through the tube 10, cools the temperature regulating part 5 under the hopper while passing through the cooling hole 9, and is returned to the tank 21 for the cooling medium through the tube 10. In this manner, the cooling medium circulates and cools the temperature regulating part 5 under the hopper and heated by the heater 7 and the like to thereby control the temperature of the temperature regulating part 5 under the hopper. In the tank 21, a liquid level sensor 26 for detecting an amount of the cooling medium is provided.

It is also possible that a flow rate regulating valve is provided in a circulating path of the cooling medium to thereby also regulate a flow rate of the cooling medium. Although cooling fluid having rust-inhibiting characteristics and the like is used as the cooling medium, normal city water, industrial water, and the like can also be used.

The temperature regulator main body 20, the temperature sensor 8, and a controller 30 for controlling the temperature regulator main body 20 form the temperature regulator of the temperature regulating part under the hopper. The invention is characterized in that the controller 30 forming the temperature regulator is formed of a controller for controlling the injection molding machine. An output signal from the temperature sensor 8 provided to the temperature regulating part 5 under the hopper is input to the controller 30 and the controller 30 controls ON/OFF state of the motor 25 for driving the fan 24 based on the detected temperature of the temperature regulating part 5 under the hopper, detected by the temperature sensor 8, to control the temperature of the circulating cooling medium and finally carries out a feedback control so that the temperature of the temperature regulating part 5 under the hopper becomes a target temperature.

Operation of the first embodiment of the temperature regulator under the hopper of the injection molding machine according to the invention will be described by using flow charts in FIGS. 2 and 3.

When the injection molding machine is turned on (step A1), the injection molding machine is inspected for abnormal conditions (step A2). If an abnormal condition is found, the injection molding machine is turned off to carry out operation for treating the abnormal condition of the injection molding machine (step A3). The detected abnormal condition is cancelled and the machine is turned on again and inspected for abnormal conditions again. If an abnormal condition is found thereafter, the above operation is repeatedly carried out.

If no abnormal condition is found, the heater 7 is turned on to heat the heating cylinder 2 and the nozzle 3 (step A4). Whether an abnormal condition is caused to a heater circuit or not is also judged (step A5). If an abnormal condition is detected, a heater control is turned off and the abnormal condition of the heater circuit is eliminated (step A6). Then, processings in steps A4, A5, and A6 are carried out until no abnormal condition is detected in the heater circuit.

If no abnormal condition is detected in the heater circuit, a control of the temperature regulator is made possible (step A7). The temperature regulator may be operated manually to drive the pump 22 and the like or the temperature regulator may automatically operate when a temperature of the heating cylinder 2 is detected and the temperature reaches a predetermined temperature or when a predetermined time has elapsed since the heater 7 was turned on.

After the start of operation of the temperature regulator, whether or not there is any abnormal condition in the temperature regulator is judged based on signals from various sensors and the like provided to the temperature regulator (step A8). The presence or absence of the abnormal condition is detected based on the signals from the various sensors, e.g., based on a signal indicating whether or not a reduction in the cooling medium is detected from the sensor 26 for detecting the amount of the cooling medium in the tank 21. If an abnormal condition is detected, an alarm message or the like is displayed on a display or the like provided to the controller 30 to make the abnormal condition of the temperature regulator known and operation of the injection molding machine is stopped (step A9). An operator treats the abnormal condition of the temperature regulator based on the alarm indication (step A10) and cancels the alarm (step A11) Then, the processings of steps A8 to A11 are repeatedly carried out until no abnormal condition of the temperature regulator is detected. When no abnormal condition is further detected, the pump 22 of the temperature regulator main body 20 and the motor 25 for driving the fan 24 are driven (step A12). By driving of the pump 22, the cooling medium circulates in a circulating path in which the medium passes through the radiator 23 and the tube 10 from the tank 21, further passes through the cooling hole 9 in the temperature regulating part 5 under the hopper, and returns to the tank 21 through the tube 10.

Then, if an operation finish command of the injection molding machine has been input is judged (step A13). If it has not been input, the temperature regulator is inspected for abnormal conditions similarly to the above description (step A14). If there is no abnormal condition, the process proceeds to step A20 where a temperature T of the temperature regulating part 5 under the hopper is read from the temperature sensor 8 and is compared with a set temperature TS. If the detected temperature T is lower than the set temperature TS, driving of the motor 25 is stopped to stop rotation of the fan 24 (step A22). On the other hand, if the detected temperature T is higher than the set temperature TS, the motor 25 is driven to rotate the fan 24 (step A23) and the process returns to the step A13. After that, until the operation finish command is input and unless the abnormal condition of the temperature regulator is detected, the controller 30 repeatedly carries out the processings of steps A13, A14, A20, A21, and A22 or A23.

Although ON/OFF of the motor for driving the fan is controlled based on a result of the comparison between the detected temperature T and the set temperature TS, it is also possible to closely control a time for which the motor for driving the fan is in an ON state by a PID (proportional plus integral plus derivative) control based on a deviation of the detected temperature T from the set temperature TS. It is also possible to control a rotation speed of the motor by the PID control.

The temperature T of the temperature regulating part 5 under the hopper is increased by the heater 7 and the like provided to the outer periphery of the heating cylinder 2. The temperature T of the temperature regulating part 5 under the hopper is detected by the temperature sensor 8. If the detected temperature T becomes equal to or higher than the set temperature TS, the fan 24 is rotated to cool the circulating cooling medium by the radiator 23 and the temperature regulating part 5 under the hopper is cooled by the cooling medium. Thus, the temperature of the temperature regulating part 5 under the hopper is feedback controlled.

If the abnormal condition of the temperature regulator is detected at step A14, the pump 22 and the motor 25 for driving the fan are stopped and the alarm is displayed on the display or the like of the controller 30 (steps A15, A16). Then, the abnormal condition of the temperature regulator is cancelled (step A17), the alarm indication is cancelled, the pump 22 of the temperature regulator main body 20 is driven to bring the temperature regulator main body 20 into operation again (steps A18, A19), and the process proceeds to step A20.

If the operation finish command is input, the control of the temperature regulator is turned off and driving of the pump 22 and the motor 25 is stopped (step A24). Furthermore, the control of the heater 7 is stopped (step A25), the injection molding machine is turned off, and molding operation is finished (step A26).

Figure 4:
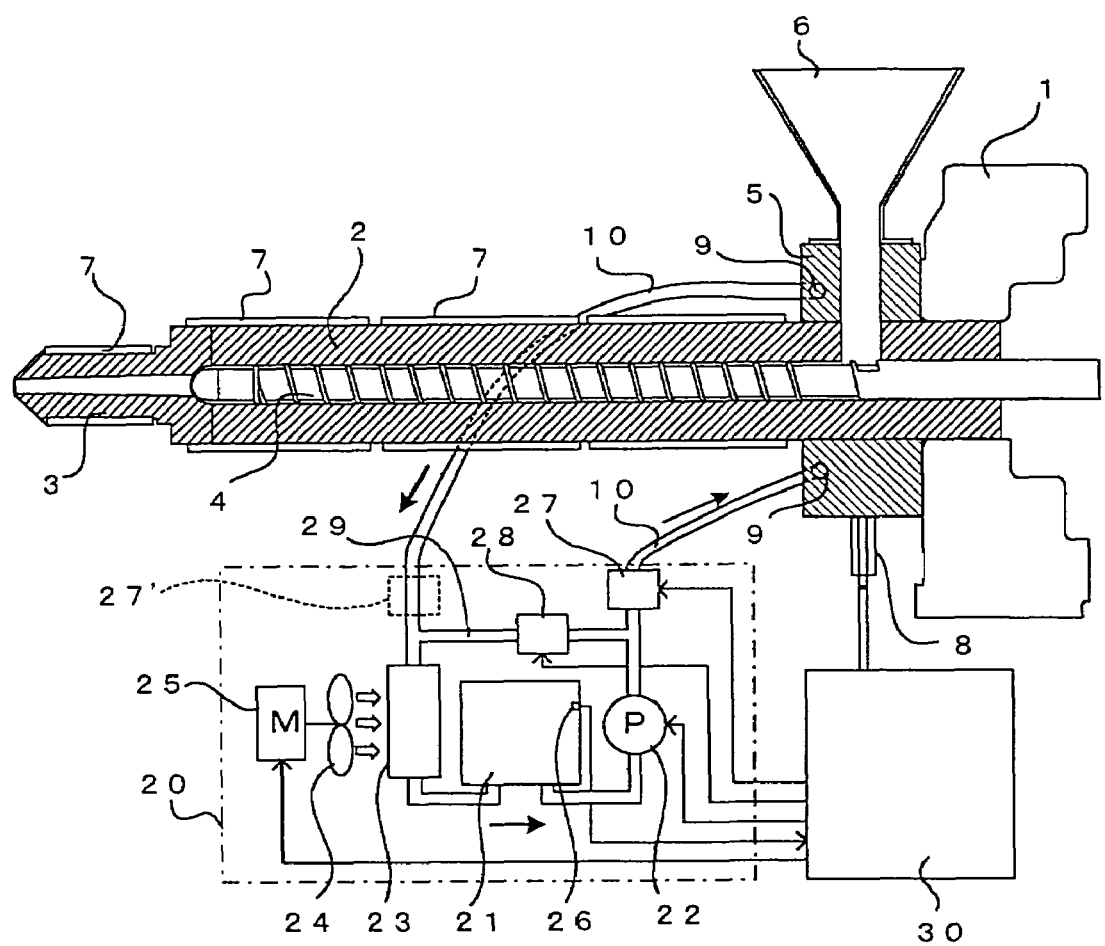
FIG. 4 is a schematic explanatory view of a second embodiment of a temperature regulator according to the invention.

Next, a second embodiment of the temperature regulator under the hopper of the injection molding machine according to the invention will be described by reference to FIGS. 4 and 5.

The second embodiment is different from the first embodiment only in that solenoid valves 27 and 28 and a bypass circuit 29 are provided to the temperature regulator main body 20 and that the radiator 23 is provided on a return side of the cooling medium of the temperature regulator main body 20 and is similar to the first embodiment in other points. In other words, the temperature regulator of this embodiment includes, as shown in FIG. 4, a solenoid valve 27 for opening and closing a circulating path for supplying the cooling medium to the temperature regulating part 5 under the hopper and a solenoid valve 28 for switching the cooling medium to a circulating path for circulating the medium through the bypass circuit 29. The cooling medium which has passed through the temperature regulating part 5 under the hopper or the cooling medium which has passed through the bypass circuit 29 returns to the tank 21 through the radiator 23. Other structures are similar to those of the temperature regulator of the first embodiment.

If the solenoid valve 27 is opened and the solenoid valve 28 is closed, the cooling medium taken out from the tank 21 by the pump 22 is lead into the cooling hole 9 in the temperature regulating part 5 under the hopper through the solenoid valve 27 and the tube 10, cools the temperature regulating part 5 under the hopper while passing through the cooling hole 9, passes through the tube 10, returns to the radiator 23 where the medium is cooled by cold air from the fan 24, and returns to the tank 21. The cooling medium circulates through the circulating path through the pump 22, the solenoid valve 27, the temperature regulating part 5 under the hopper, the radiator 23, and the tank 21. If the solenoid valve 27 is closed and the solenoid valve 28 is opened, the cooling medium taken out from the tank 21 by the pump 22 circulates through the circulating path through the solenoid valve 28, the bypass circuit 29, the radiator 23, and the tank 21.

Similarly to the first embodiment, the radiator 23 may be provided to the cooling medium on the supply side thereof, not on the return side thereof. In other words, the cooling medium discharged from the pump 22 may be lead to the radiator 23, cooled by the fan 24, lead to the temperature regulating part 5 under the hopper through the solenoid valve 27 or lead to the bypass circuit 29 through the solenoid valve 28, and returned to the tank 21 serving as the circulating path. Although the solenoid valve 27 is provided to the temperature regulator main body 20 on an outlet side (supply side) of the cooling medium, as shown in FIG. 4 in the second embodiment, it may be provided to the temperature regulator main body 20 on the return side of the cooling medium, as shown in broken lines with a reference numeral 27' in FIG. 4.

Operation of the second embodiment of the temperature regulator under the hopper of the injection molding machine according to the invention will be described by using the flow chart (steps A1 to A12) in FIG. 2 and the flow chart in FIG. 5 (step A13 and the following steps) which is continued from FIG. 2. Operations of steps A1 to A21 and operations of steps A24 to A26 are similar to those in the first embodiment.

Figure 5:
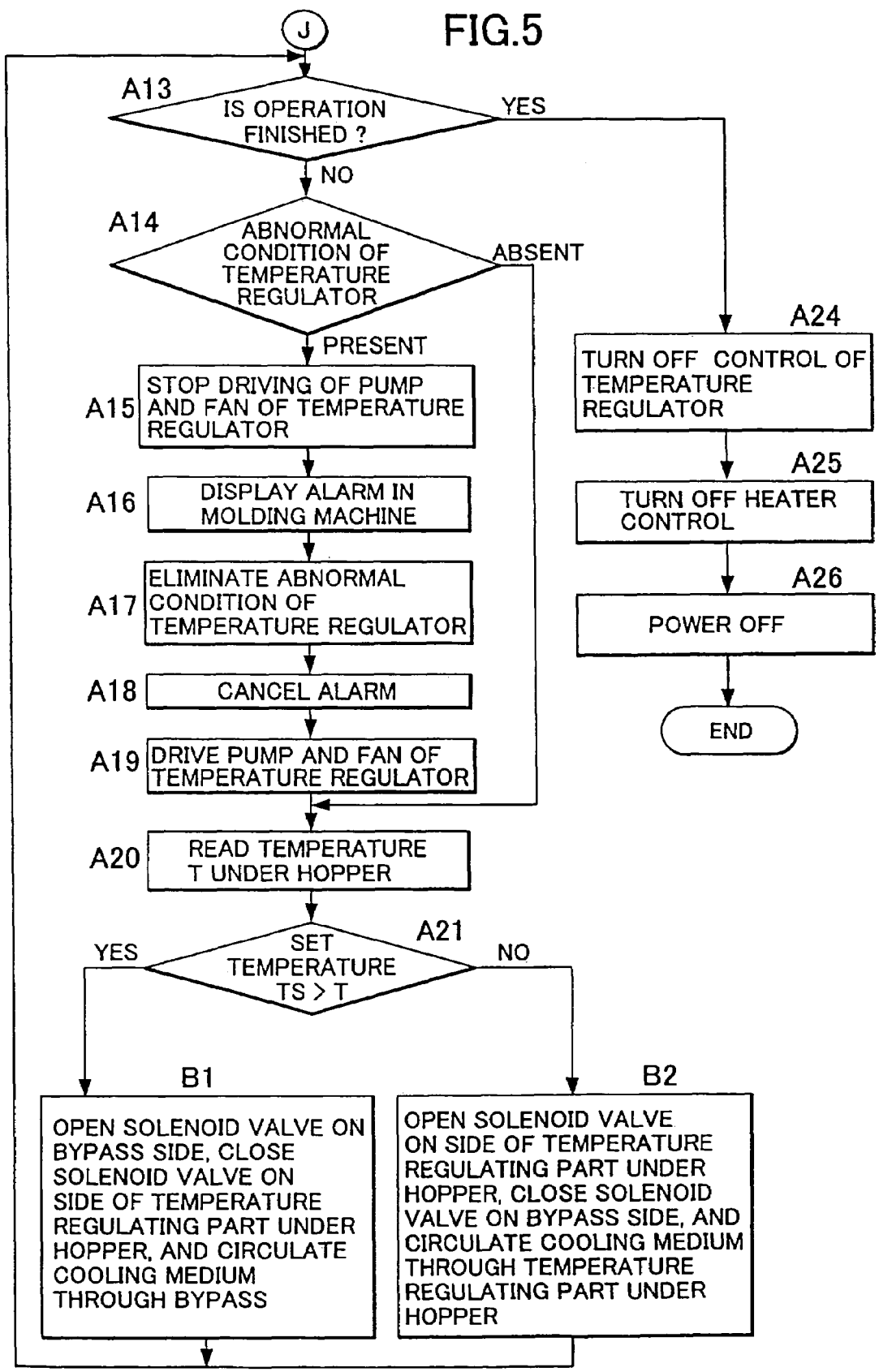
FIG. 5 is a flow chart of operation of the temperature regulator in FIG. 4 (continued from the flow chart in FIG. 2).

In the present embodiment, as shown in FIG. 5, the temperature T of the temperature regulating part 5 under the hopper, detected by the temperature sensor 8, is compared with the set temperature TS at step A21. If the detected temperature T is lower than the set temperature TS, the controller 30 opens the solenoid valve 28 of the bypass circuit 29 and closes the solenoid valve 27 on a side of the temperature regulating part under the hopper to make a switch so that the cooling medium circulates through the bypass circuit (step B1) and the process returns to step A13. On the other hand, if the detected temperature T is higher than the set temperature TS, the controller 30 opens the solenoid valve 27 on the side of the temperature regulating part under the hopper and closes the solenoid valve 28 of the bypass circuit 29 to make a switch so that the cooling medium circulates through the temperature regulating part 5 under the hopper (step B2) and the process returns to step A13. After that, until the operation finish command is input and unless the abnormal condition of the temperature regulator is detected, the controller 30 repeatedly carries out processings of steps A13 to A21 and step B1 or B2.

The processings of steps B1 and B2 are different from those of steps A22 and A23 where the fan is rotated and stopped in the first embodiment but other processings are similar to those in the first embodiment.

The second embodiment will be generally and briefly described, though this description will overlap that of the first embodiment. When the injection molding machine is turned on, the injection molding machine is inspected for abnormal conditions. If an abnormal condition is found, the injection molding machine is turned off to eliminate the abnormal condition of the injection molding machine (steps A1 to A3). If no abnormal condition is found, the heater 7 is turned on to heat the heating cylinder 2 and the nozzle 3. If an abnormal condition of the heater circuit is detected, a heater control is turned off and the abnormal condition of the heater circuit is eliminated (steps A4 to A6). If no abnormal condition is detected in the heater circuit, a control of the temperature regulator is made possible. After the start of operation of the temperature regulator (step A7), if there is no abnormal condition in the temperature regulator is judged based on signals from the various sensors and the like provided to the temperature regulator (step A8). The presence or absence of the abnormal condition is detected based on the signals from the various sensors, e.g., based on a signal indicating whether or not a reduction in the cooling medium is detected from the sensor 26 for detecting the amount of the cooling medium in the tank 21. If the abnormal condition is detected, the alarm message or the like is displayed on the display or the like provided to the controller 30 to inform of the abnormal condition of the temperature regulator and operation of the injection molding machine is stopped. An operator cancels the abnormal condition of the temperature regulator based on the alarm indication and cancels the alarm (steps A9 to A11). When no abnormal condition is further detected, the pump 22 of the temperature regulator main body 20 and the motor 25 for driving the fan 24 are driven (step A12). By driving the pump 22, the cooling medium circulates through the tank 21, the pump 22, the solenoid valve 28, the bypass circuit 29, the radiator 23, and the tank 21. When the controller is turned on, the solenoid valve 27 is controlled to be closed and the solenoid valve 28 is controlled to be opened by an initial setting.

Then, if the operation finish command of the injection molding machine has been input is judged (step A13). If it has not been input, the temperature regulator is inspected for abnormal conditions similarly to the above description (step A14) If there is no abnormal condition, the process proceeds to step A20 where the temperature T of the temperature regulating part 5 under the hopper is read from the temperature sensor 8 and is compared with the set temperature TS. The above-described opening and closing operations of the solenoid valves 27 and 28 of step B1 or B2 are carried out according to the result of the comparison and the process returns to step A13. After that, operations of steps A13 to A21 and step B1 or B2 are repeated. When the temperature T of the temperature regulating part 5 under the hopper, detected by the temperature sensor 8, becomes equal to or higher than the set temperature TS, the solenoid valve 27 is opened and the solenoid valve 28 is closed to thereby switch the cooling medium into the circulating path passing through the temperature regulating part 5 under the hopper to cool the temperature regulating part 5 under the hopper. If the detected temperature T becomes lower than the set temperature TS, the solenoid valve 27 is closed and the solenoid valve 28 is opened. As a result, the cooling medium passes through the bypass circuit 29 and does not pass through the temperature regulating part 5 under the hopper. Thus, the temperature of the temperature regulating part 5 under the hopper is feedback controlled.

Although opening and closing operations of the solenoid valves 27 and 28 are controlled based on which of the detected temperature T and the set temperature TS is higher, it is also possible to closely control opening and closing operations of the solenoid valves by the PID control based on a deviation of the detected temperature T from the set temperature TS.

If the abnormal condition of the temperature regulator is detected at step A14, the pump 22 and the motor 25 for driving the fan are stopped and the alarm is displayed on the display or the like of the controller 30. If the abnormal condition of the temperature regulator is cancelled (steps A15 to A17), the alarm indication is cancelled, the pump 22 of the temperature regulator main body 20 is driven to bring the temperature regulator main body 20 into operation again (steps A18, A19), and the process proceeds to step A20.

Although the circulating paths of the cooling medium are switched by the solenoid valves 27 and 28 controlled by the controller 30 in the second embodiment, it is also possible to provide a selector valve instead of the solenoid valves 27 and 28 to select the circulating path of the cooling medium by switching the selector valve based on the signal from the controller 30.

The invention claimed is:

1. A temperature regulator of a temperature regulating part under a hopper of an injection molding machine, comprising:

a cooling medium circulating unit including a radiator, a fan facing the radiator, a motor for driving the fan, a pump for sending a cooling medium passing through the radiator to the temperature regulating part under the hopper, and a bypass flow path;

a temperature detecting unit for detecting a temperature of the cooling medium; and a cooling medium circulating path switching mechanism for causing a controller for controlling the injection molding machine to switch the cooling medium to a circulating path not passing through the bypass flow path or to a circulating path passing through the bypass flow path based on the temperature of the cooling medium detected by the temperature detecting unit.

2. A temperature regulator of a temperature regulating part under a hopper of an injection molding machine, comprising:

a fan attached to a motor for cooling a cooling medium;
a radiator facing the fan;
a tank for storing the cooling medium;
a pump for circulating the cooling medium; and
cooling medium circulating paths provided with a valve for switching the circulating paths so that the cooling medium can circulate through the temperature regulating part under the hopper or through a bypass circuit, the valve for switching the circulating paths being controlled by a control signal from a controller of the injection molding machine, where the temperature detected by a temperature sensor arranged in the temperature regulating part under the hopper is fed back to the controller of the injection molding machine; and when the injection molding machine is in an ON state and a heater control of a heating cylinder of the injection molding machine is also in an ON state, the valve for switching the circulating paths for the cooling medium is controlled by the control signal from the controller of the injection molding machine so that the temperature of the temperature regulating part under the hopper becomes equal to the preset temperature.

3. The temperature regulator of a temperature regulating part under a hopper of an injection molding machine according to claim 2, wherein operation of the injection molding machine is stopped with an alarm message displayed when an abnormal condition occurs.

* * * * *

UNITED STATES PATENT AND TRADEMARK OFFICE
CERTIFICATE OF CORRECTION

PATENT NO. : 7,249,940 B2
APPLICATION NO. : 10/859361
DATED : July 31, 2007
INVENTOR(S) : Koji Senda et al.

It is certified that error appears in the above-identified patent and that said Letters Patent is hereby corrected as shown below:

Column 1, Line 39, change "abase" to --a base--.

Column 2, Line 43, change "pre set" to --preset--.

Column 5, Line 23, after "step A11)" insert --.--.

Column 5, Line 23, after "alarm (step A11)" start a new paragraph.

Column 8, Line 17, after "A14)" insert --.--.

Signed and Sealed this

Eleventh Day of December, 2007

JON W. DUDAS
*Director of the United States Patent and Trademark Office*